No. 759,030. PATENTED MAY 3, 1904.
J. W. SHEAFFER.
INSECT TRAP.
APPLICATION FILED FEB. 7, 1903.
NO MODEL.
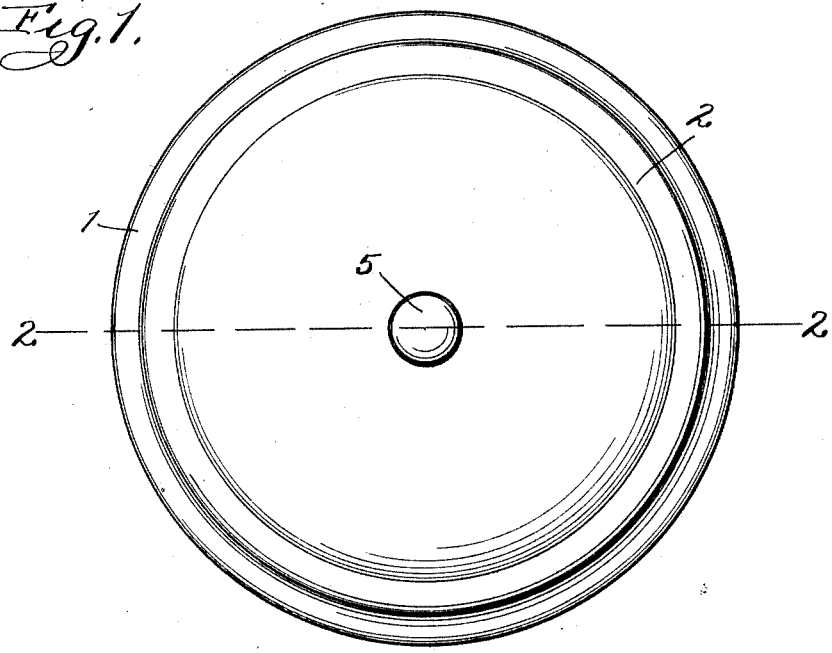
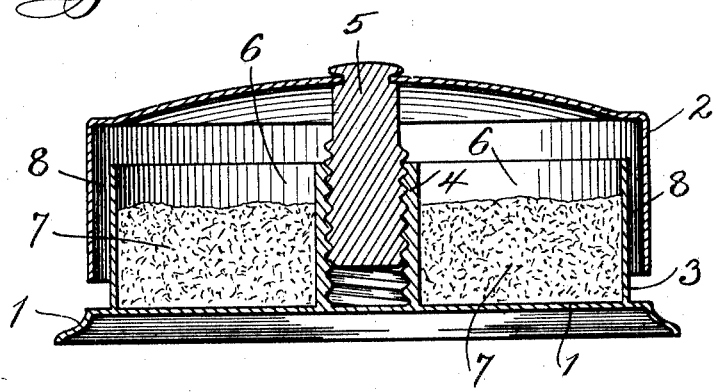
Witnesses:
R. J. Jacker
J. E. McPherran
Inventor:
John W. Sheaffer,
Walter N. Haskell,
Atty.
By No. 759,030. Patented May 3, 1904.

UNITED STATES PATENT OFFICE.

JOHN WILSON SHEAFFER, OF STERLING, ILLINOIS.

INSECT-TRAP.

SPECIFICATION forming part of Letters Patent No. 759,030, dated May 3, 1904.

Application filed February 7, 1903. Serial No. 142,379. (No model.)

*To all whom it may concern:*

Be it known that I, JOHN WILSON SHEAFFER, a citizen of the United States, residing at Sterling, in the county of Whiteside and State of Illinois, have invented certain new and useful Improvements in Insect-Traps; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has reference to insect-traps, and is more especially designed for the extermination of ants.

The device is constructed to contain some poisonous substance which is readily devoured by the insects and which can be easily got at by them, but which is so concealed as to prevent access thereto of fowls or animals. At the same time the receptacle for the poison is easily uncovered for the purpose of renewing the same or cleaning the trap.

In the drawings, Figure 1 is a plan view of my invention. Fig. 2 is a cross-section thereof in the line 2 2 of Fig. 1.

1 is a circular base, and 2 a circular cover of a little less diameter than the base 1. Reared upon the base 1 is a circular wall 3 and a hollow standard 4, having its inner wall threaded to correspond with a thread on a circular support 5, centrally secured in the cover 2. By this means such cover may be attached to or detached from the base 1, as desired. Between the outer wall of the standard 4 and the wall 3 is a circular compartment 6, adapted to contain a poisonous preparation 7. Between the wall 3 and rim of the cover 2 is an interval 8 to permit the entrance of the insects into the trap. The cover 2 is always supported at a sufficient height to leave an opening between the lower edge thereof and the base 1.

The principal parts of the device are preferably constructed of tin or other sheet metal, the same being thereby easily and cheaply manufactured.

Any kind of poisonous substance can be placed in the receptacle; but some preparations in a semiliquid state are found to be preferable, and the trap is specially adapted to mixtures of that kind, although suitable for any kind thereof.

It is apparent that the cover of the trap can be readily removed or replaced and that while it is in position nothing except insects can gain access to the poison. On account of its peculiar construction the trap can be entered by insects from any direction.

When not in use, the cover 2 can be turned downwardly until the lower edge thereof rests upon the base 1, in which condition the trap may be put away out of use and the poisonous material therein preserved. When thus closed, it also lessens the danger of the poison being reached and eaten by children or animals.

What I claim as my invention, and desire to secure by Letters Patent of the United States, is—

In an insect-trap, the combination of the base 1; circular in form; the poison-receptacle 3, circular in form, supported on the base 1, and of slightly less diameter therewith; the cover 2, having a circular wall parallel with, and spaced apart from the wall of the poison-receptacle, the inwardly-threaded standard 4, centrally of the base 1, and the externally-threaded stem 5, centrally of the cover 2, substantially as shown.

In testimony whereof I affix my signature in presence of two witnesses.

JOHN WILSON SHEAFFER.

Witnesses:
    I. L. WEAVER,
    EUGENE SCATES.